(12) United States Patent
Allum

(10) Patent No.: US 9,209,684 B2
(45) Date of Patent: Dec. 8, 2015

(54) RADIATION HARDENED CHARGE PUMP

(71) Applicant: Microelectronics Research and Development Corporation, Colorado Springs, CO (US)

(72) Inventor: Dean Allum, Colorado Springs, CO (US)

(73) Assignee: MICROELECTRONICS RESEARCH AND DEVELOPMENT, Colorado Springs, CO (US)

( * ) Notice: Subject to any disclaimer, the term of this patent is extended or adjusted under 35 U.S.C. 154(b) by 0 days.

(21) Appl. No.: 13/683,806

(22) Filed: Nov. 21, 2012

(65) Prior Publication Data

US 2014/0062581 A1 Mar. 6, 2014

Related U.S. Application Data

(60) Provisional application No. 61/741,777, filed on Aug. 31, 2012.

(51) Int. Cl.
*G05F 1/10* (2006.01)
*H02M 3/155* (2006.01)
*H02M 3/07* (2006.01)

(52) U.S. Cl.
CPC .............. *H02M 3/155* (2013.01); *H02M 3/073* (2013.01); *H02M 2003/077* (2013.01)

(58) Field of Classification Search
CPC .... G11C 5/145; G11C 16/30; G11C 11/5642; G11C 11/5628
See application file for complete search history.

(56) References Cited

U.S. PATENT DOCUMENTS

| 6,023,188 | A  | * | 2/2000  | Lee et al.       | 327/536 |
|-----------|----|---|---------|------------------|---------|
| 6,356,157 | B1 | * | 3/2002  | Kawamura         | 331/11  |
| 6,404,271 | B2 | * | 6/2002  | Ayres            | 327/536 |
| 6,429,724 | B1 | * | 8/2002  | Ogura et al.     | 327/536 |
| 6,781,440 | B2 | * | 8/2004  | Huang            | 327/537 |
| 6,965,334 | B2 | * | 11/2005 | May et al.       | 341/144 |
| 7,164,309 | B1 | * | 1/2007  | Smith et al.     | 327/539 |
| 7,193,839 | B2 | * | 3/2007  | Hacsi            | H01G 11/00 |
|           |    |   |         |                  | 361/306.1 |
| 7,274,248 | B2 | * | 9/2007  | Okamoto          | 327/536 |
| 7,365,578 | B2 | * | 4/2008  | Senda et al.     | 327/108 |
| 7,629,831 | B1 | * | 12/2009 | Perisetty et al. | 327/536 |
| 7,956,675 | B2 | * | 6/2011  | Saitoh et al.    | 327/536 |
| 8,558,592 | B2 | * | 10/2013 | Sreekiran et al. | 327/157 |
| 2010/0013548 | A1 | * | 1/2010  | Barrow         | 327/536 |
| 2010/0166229 | A1 | * | 7/2010  | Pennock et al. | 381/122 |
| 2010/0210299 | A1 | * | 8/2010  | Gorbachov      | H04B 1/406 |
|           |    |   |         |                  | 455/552.1 |

* cited by examiner

*Primary Examiner* — Sibin Chen
(74) *Attorney, Agent, or Firm* — Todd L. Juneau

(57) ABSTRACT

The invention is a radiation hardened charge-pump system and method of using polysilicon diodes and metal-to-metal capacitors in a standard CMOS process technology that provides boosted positive or negative voltages higher than power supply voltage levels, that reduces or eliminates field leakage, bipolar snap-back, SEL problems, and the SEGR problem. The charge-pump system is arranged as multiple parallel redundant pumps to harden the circuit so that if there is a single-event transient, or an unknown polysilicon-diode failure in a new technology, the remaining pumps will continue to operate. A diode placed at the end of each redundant pump section allows charge to be placed onto the high voltage node without removing charge due to failure of one of the sections. With the use of auxiliary circuits, such as a voltage doubler, this hardened charge pump can be used reliably at low power supply voltage levels.

21 Claims, 12 Drawing Sheets

RADIATION HARDENED CHARGE PUMP

CROSS REFERENCE TO RELATED APPLICATIONS

This application claims priority to U.S. patent application 61/741,777 filed Aug. 31, 2012, the contents of which are incorporated herein in their entirety.

STATEMENT REGARDING FEDERALLY SPONSORED RESEARCH OR DEVELOPMENT

N/A.

NAMES OF PARTIES TO A JOINT RESEARCH AGREEMENT

Not applicable.

BACKGROUND

1. Field of the Invention

The present invention generally relates to a radiation hardened charge pump for electronic circuitry, and in particular to the use of a polysilicon diode in combination with a capacitor, and to the use of multiple redundant charge pumps.

2. Background of the Invention

Integrated charge pump circuits have been in use since the 1970's. For commercial nonvolatile memories, the point of failure in radiation environments is usually the on-chip high voltage charge pump. For Total Ionizing Dose (TID) exposure the charge pumps fail due to parasitic metal oxide semiconductor (MOS) field leakage. For Single Event Effects (SEE), the charge pumps fail due to either destructive bipolar snapback, Single Event induced Latch-Up (SEL), or Single Event Gate oxide Rupture (SEGR). Most of these effects are aggravated by on-chip high voltages, which are unique to nonvolatile memories.

Phase-Locked-Loop (PLL) timing control circuits have a weak point in radiation environments. There is a voltage-reference-generation circuit in the feedback loop. The voltage reference is used to set the frequency of Voltage Controlled Oscillator (VCO). This reference generator is often known as a charge pump. It usually contains a current source and current sink to alternatively rise or lower the reference voltage. The control signals are typically labeled "up" and "down" respectively. The current source and sink are constructed of metal oxide semiconductor field effect transistors (MOSFETs). These MOSFETs are sensitive to Field leakage or Digital-Single-Event-Transients (DSETs) which can cause permanent or temporary failure of the behavior of the PLL.

BRIEF SUMMARY OF THE INVENTION

In a preferred embodiment of the present invention, there is provided a radiation-hardened circuit component in combination with a capacitor, wherein the radiation-hardened circuit component is selected from the group consisting of a polysilicon diode, a PMOS transistor in series with a ballast resistor, and a NMOS transistor in series with a ballast resistor.

In another preferred embodiment according to the present invention, there is provided a method of radiation hardening electronic circuitry in a spaceborne, airborne, or terrestrial device, comprising installing or integrating the radiation hardened charge pump described herein.

In another preferred embodiment according to the present invention, there is provided a radiation hardened charge pump or method of use wherein the charge pump is part of a multiple parallel charge pump array, each of the charge pumps of the array having its' own diode.

In another preferred embodiment according to the present invention, there is provided a radiation hardened charge pump or method of use wherein the radiation-hardened circuit component is a polysilicon diode.

In another preferred embodiment according to the present invention, there is provided a radiation hardened charge pump or method of use wherein the radiation-hardened circuit component is a PMOS transistor in series with a ballast resistor.

In another preferred embodiment according to the present invention, there is provided a radiation hardened charge pump or method of use wherein the radiation-hardened circuit component is a NMOS transistor in series with a ballast resistor.

In another preferred embodiment according to the present invention, there is provided a radiation hardened charge pump or method of use wherein the charge pump is a charge-positive chargepump.

In another preferred embodiment according to the present invention, there is provided a radiation hardened charge pump or method of use wherein the charge pump is a charge-negative chargepump.

In another preferred embodiment according to the present invention, there is provided a radiation hardened charge pump or method of use wherein the charge pump is connected to a circuit.

In another preferred embodiment according to the present invention, there is provided a radiation hardened charge pump or method of use wherein the charge pump is powered by a voltage doubler.

In another preferred embodiment according to the present invention, there is provided a radiation hardened charge pump or method of use wherein the charge pump is connected to a high-voltage switch.

In another preferred embodiment according to the present invention, there is provided a radiation hardened charge pump or method of use wherein one or more charge pumps are utilized within a Phase Locked Loop.

In another preferred embodiment according to the present invention, there is provided a radiation hardened charge pump or method of use wherein the capacitor is a metal to metal capacitor.

In another preferred embodiment according to the present invention, there is provided a radiation hardened charge pump or method of use wherein the radiation hardening provides hardening against radiation that is selected from the group consisting of neutron, proton, gamma, thermal, alpha, x-ray, cosmic, heavy ion, particle, and combinations thereof.

BRIEF DESCRIPTION OF THE DRAWINGS

FIG. 6 illustrates a particle strike, or single event upset (SEU), disabling pump 6 but allowing 100% capability to remain from the other 5 pumps.

DETAILED DESCRIPTION OF THE INVENTION

By using polysilicon diodes and metal-to-metal capacitors, a radiation hardened charge-pump is constructed in a standard CMOS process technology. This charge-pump is capable of providing boosted positive or negative voltages "well beyond" the power supply voltage levels. The use of polysilicon diodes in this charge pump mitigates the field leakage, bipolar snap-back, and SEL problems of commercial charge pumps. The use of metal-based capacitors mitigates the SEGR problem.

By arranging the pump as multiple parallel redundant pumps, the circuit is further hardened against transient voltage glitches, and unforeseen reliability failures. If there is a single-event transient, or an unknown polysilicon-diode failure in a new technology), the remaining pumps will continue to operate. There is a diode at the end of each pump section so that charge can be placed onto the high voltage node, but charge is not removed due to failure of one of the sections.

This invention also provides a method of selectively routing the high voltage by means of multiple miniature voltage pumps. With the use of auxiliary circuits, this hardened charge pump can be used reliably at low power supply voltage levels. For instance, a voltage-doubler can be used to create an intermediate power supply higher than the chip's normal power supply. This intermediate supply can then be used to power the hardened charge pump at an efficient voltage level. The voltage-doubler circuit can also be arranged as multiple elements with a one-way diode on their outputs for redundancy. If any of the individual voltage doubling elements fails, the remaining elements will still operate.

Figure 1:
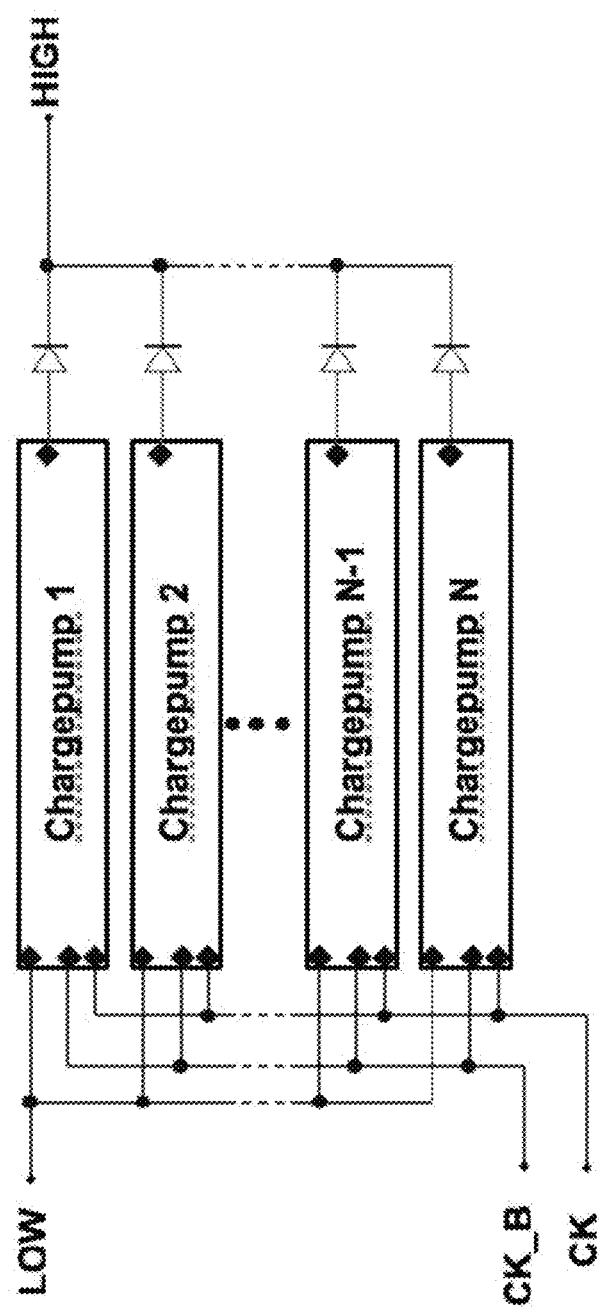
FIG. 1 is a logic schematic of an example of an inventive circuit having multiple parallel redundant charge pumps.

Referring now to the figures, FIG. 1 is a logic schematic of an example of an inventive circuit having multiple parallel redundant charge pumps. The main idea is providing multiple parallel (redundant) charge pumps. If any pump is interrupted or disabled, the remaining pumps continue to operate. The diodes prevent the failing pump from affecting the output High Voltage node. The SEE sensitive circuitry of each pump should be physically separated on the chip in order to lower the chances of an incident particle of radiation from affecting multiple pumps.

Figure 2:
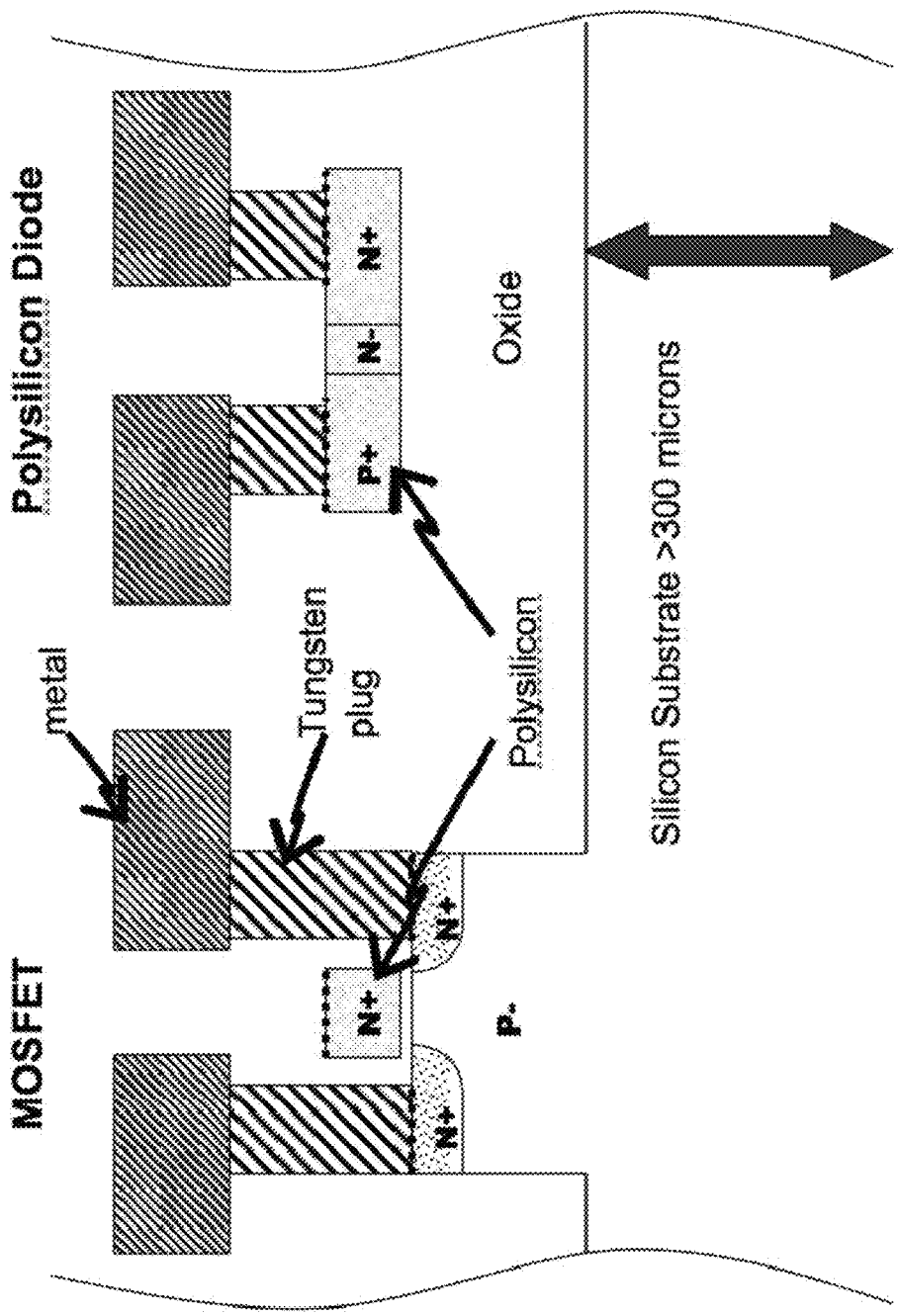
FIG. 2 is a drawing of a MOSFET next to a POLYSILICON DIODE.

FIG. 2 is a drawing of a MOSFET next to a POLYSILICON DIODE. The main idea is to show that the polysilicon diode is not sensitive to single event effects occurring in the silicon substrate, as normal MOSFETs are. The devices all exist in the top micron of this cross-section, with the substrate extending 300 microns outside of the figure. There is an isolating layer of dielectric between the polysilicon diode and the silicon substrate. The silicon substrate represents a large volume associated with a MOSFET which can effect it in a radiation environment.

Figure 3:
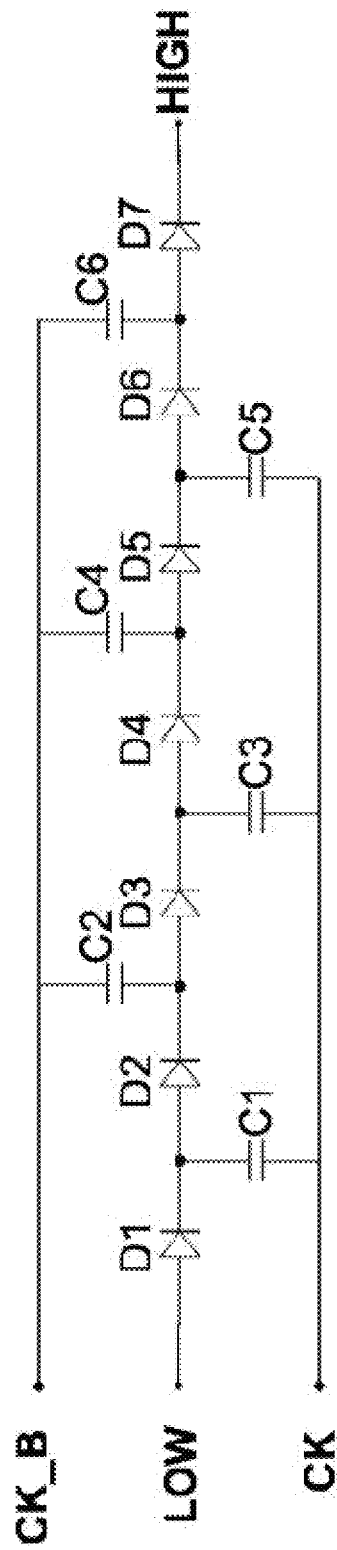
FIG. 3 is a logic schematic of a polysilicon diode/metal capacitor charge pump circuit.

FIG. 3 is a logic schematic of a polysilicon diode/metal capacitor charge pump circuit. This schematic illustrates the classical Dickenson charge pump with diodes D1-D7, capacitors C1-C6, and clock pulse train feeds CK and CK_B. While most charge pump (FLASH memory) manufacturers have replaced the diode devices with "diode-connected" NMOS-FETs, the present invention uses diodes made from polysilicon for elements D1 to D7. This is the same polysilicon already being used for the complementary metal oxide semiconductor (CMOS) gate electrodes, so there is no required manufacturing process change to use these diodes. Actually most manufacturers do not use even use these polysilicon diodes in their products, so most have not even characterized them.

Most modern charge pumps have added circuit complexity in order to reduce the voltage drop across the diode. By using polysilicon diodes with 0.8V drop, the inventive pump probably only operates down to a power supply voltage of 1.8V.

Use of polysilicon diode provides these hardening advantages over MOSFETs:
 No Single-Event induced Gate-Rupture, or Single-Event induced Punch-Through;
 Any single-event induced glitches are minimized because the diodes are electrically isolated from the large volume of the silicon substrate;
 No Total-Ionizing-Dose (TID) induced Field leakage from any pump node; and,
 No TID induced threshold voltage shift or mobility degradation.

An additional hardening claim is to use only thick-oxide capacitors in the pump in order to eliminate the possibility of Single Event induced dielectric breakdown. Therefore Gate dielectric capacitors or Poly-to-Poly capacitors should not be used in a hardened charge pump.

Figure 4:
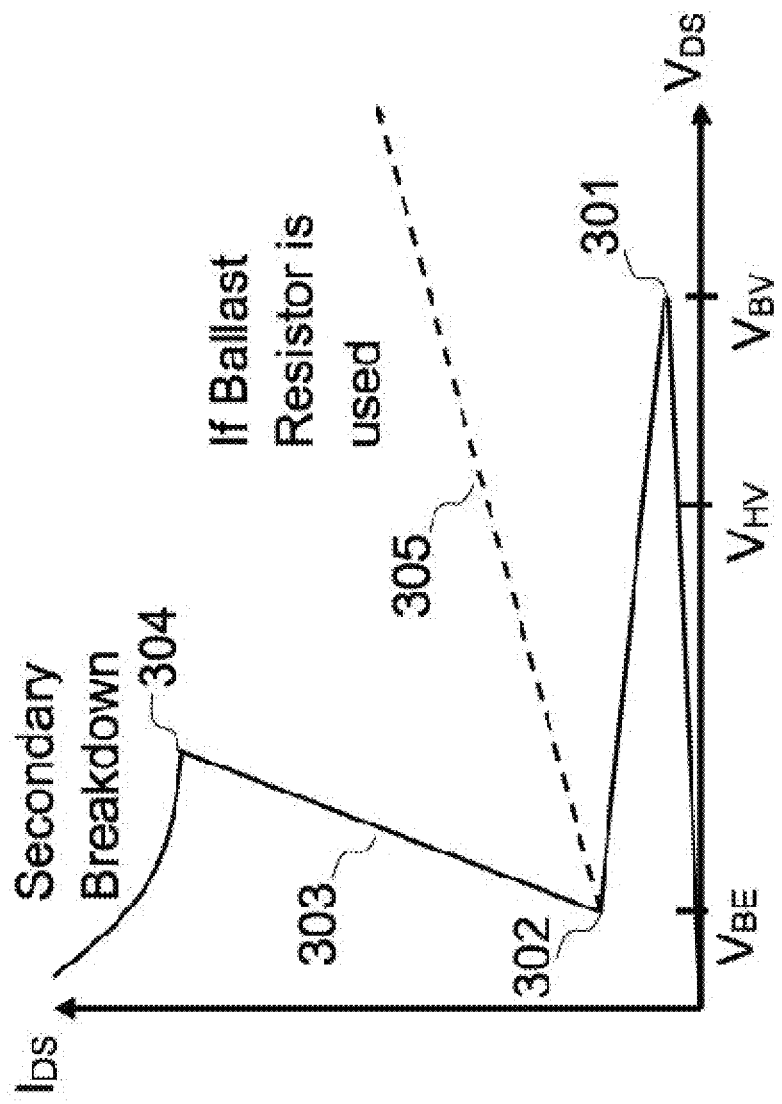
FIG. 4 is a plot of voltage during an electrostatic discharge (ESD) event across a standard MOSFET transistor compared to the current through the standard MOSFET transistor during the ESD event.

FIG. 4 is a plot of voltage during an electrostatic discharge (ESD) event across a standard MOSFET transistor compared to the current through the standard MOSFET transistor during the ESD event. An illustration of prior art MOSFET transistors, this figure can be seen in several Electro-Static-Discharge (ESD) patents. It is a plot of the voltage across vs. the current through a standard MOSFET transistor during an ESD event. The curve begins near the origin in the 'OFF' state. The applied voltage increases to the MOSFET breakdown $V_{BV}$ at point 301. The breakdown induces the turn-on of a parasitic bipolar which allows high current to flow. This is known as snap-back or MOSFET punch-though. The voltage drops to the bipolar turn-on voltage VBE at pt. 302. The current through the transistor increases along the "collector resistance" slope 303 to point 304. At this point, a destructive breakdown occurs. Local melting creates a dead short between the drain and gate of the MOSFET. In ESD hardened output transistors, designers place a ballast resistor in series with the MOSFETs. The ballast resistor limits the current through the MOSFET and prevents or postpones the destructive secondary breakdown as indicated by the dotted line 305.

The ballast resistor embodiment is useful for avoidance of destructive secondary breakdown, even if it does not necessarily directly consider an ESD event for a charge pump. Charge Pump, or high-voltage-routing MOSFETs operate at the $V_{HV}$ voltage. A radiation single event can induce them into the snap-back mode which results in a destructive secondary breakdown. The ballast resistor will prevent these MOSFETs from sustaining a destructive secondary breakdown.

Figure 5:
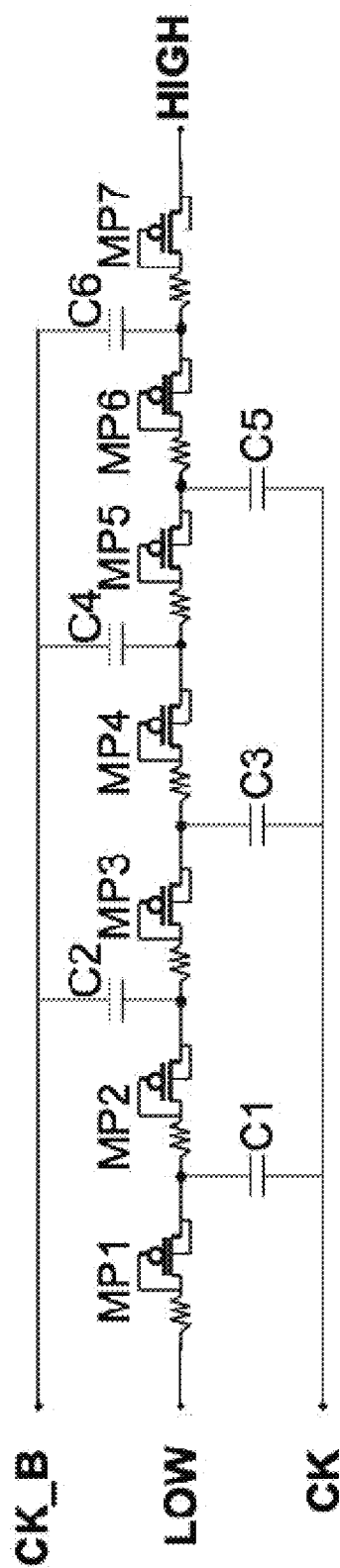
FIG. 5 is a logic schematic of an example of a series of ballast resistors with the PMOS to eliminate secondary breakdown.

FIG. 5 is a logic schematic of an example of a series of ballast resistors with the PMOS transistors MP1-MP7 and capacitors C1-C6 to eliminate secondary breakdown. Integrated negative voltage charge pumps are usually implemented with PMOS transistors. These same PMOS based pumps can be used to positive voltages if their lower port is tied to a ground or a positive voltage. The pump acts as a floating voltage source with low and high output nodes. PMOS transistors are relatively immune to Total Ionizing Doses of radiation. To prevent Single-Event induced punch-through destruction of a PMOS based charge pump, ballast resistors are added in series with the PMOS. The ballast resistor design goal is to eliminate secondary breakdown without interfering with normal pump operation. The preferred embodiment of the ballast resistors is to use polysilicon resistors which are electrically isolated from the silicon substrate.

Figure 6:
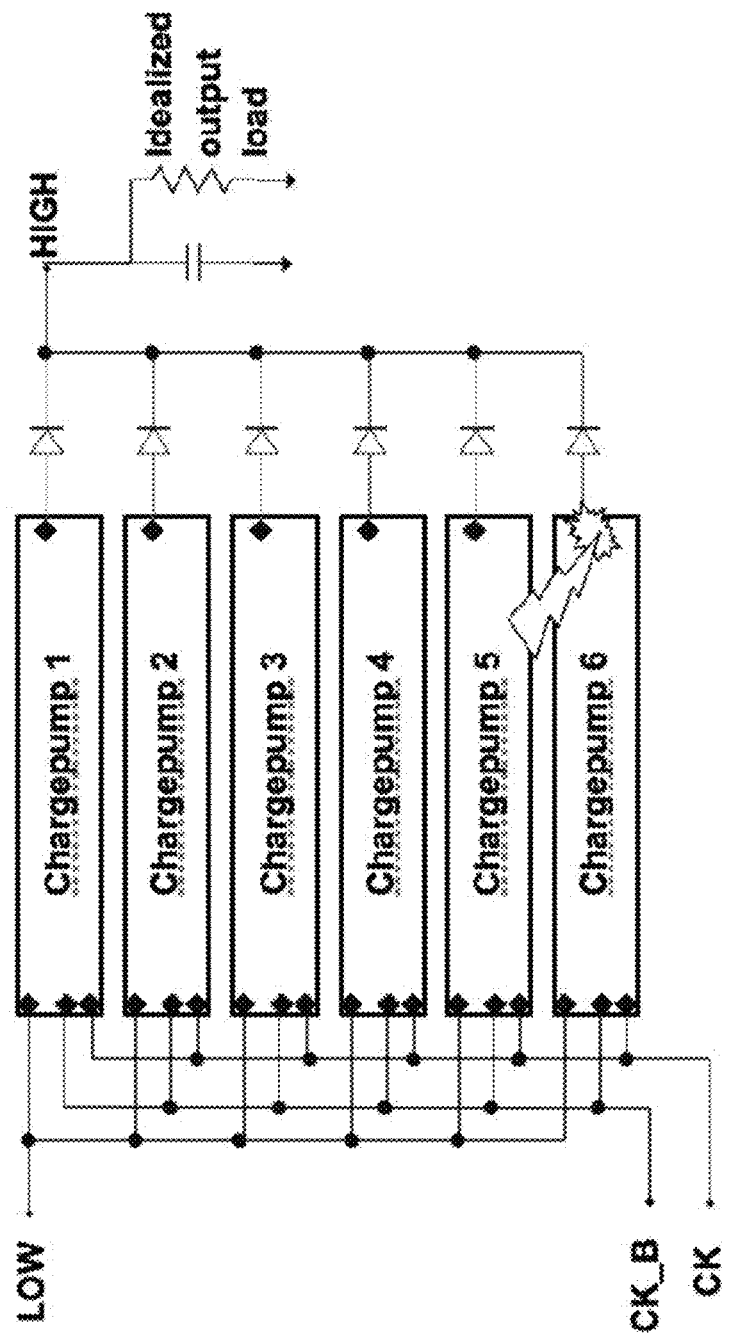
FIG. 6 is a logic schematic of a segmented multiple charge pump circuit, here showing six charge pumps (n=6) in parallel but where n may be 1-1000.

FIG. 6 is a logic schematic of a segmented multiple charge pump circuit, here showing six charge pumps (n=6) in parallel but where n may be 1-1000. FIG. 6 illustrates a particle strike, or SEU, disabling pump 6 but allowing 100% capability to remain from the other 5 pumps. Specifically, this example shows implementation of 6 parallel pumps, each with 20% or more of the required strength to drive the output load. If a particle strike somehow disables pump #6, there is still 5*20%=100% capability remaining.

Figure 7:
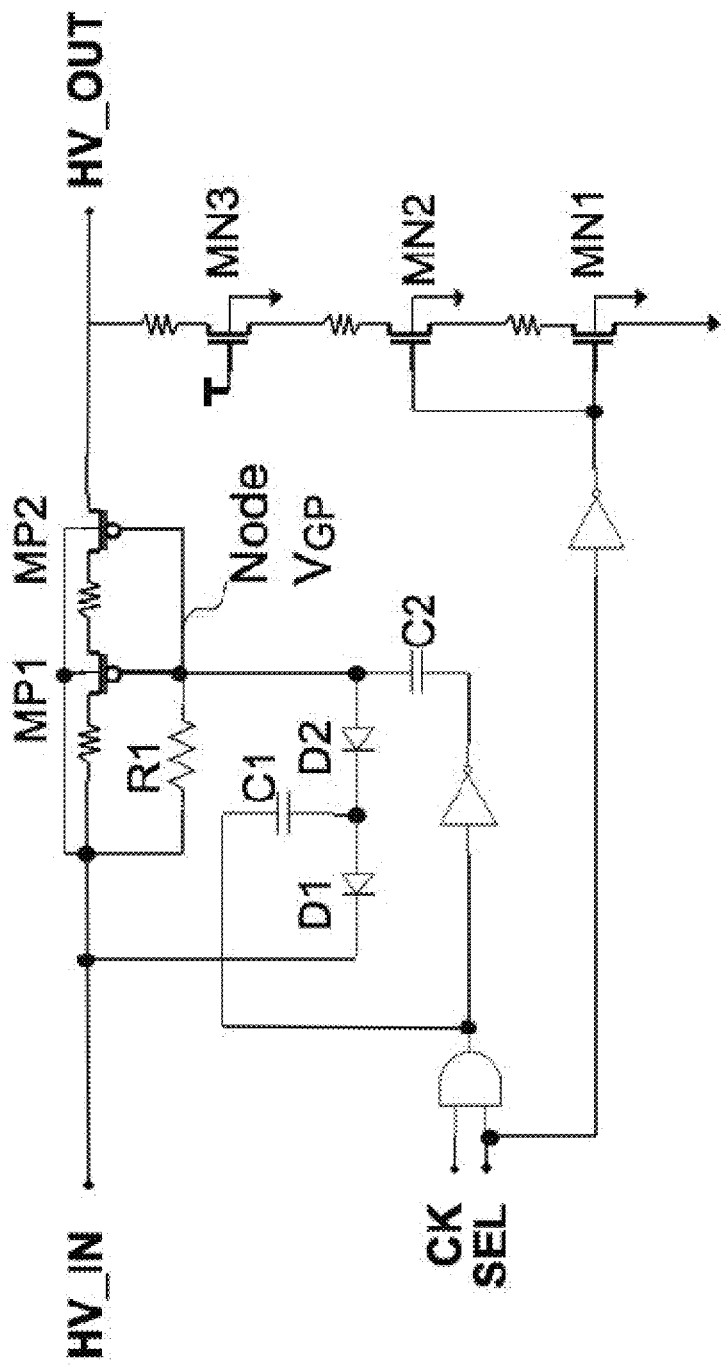
FIG. 7 is a logic schematic of a hardened high voltage 'routing'.

FIG. 7 is a logic schematic showing implementation of a hardened high voltage 'routing' utilizing poly-diode mini-charge pumps. This figure represents a high voltage switch used to selectively route the high voltage produced by the charge pump. A two stage pump composed of C1, D1, C2, D2 is used to create a negative voltage on VGP with respect to HV_IN. This allows current to flow through MP1 and MP2 when the SEL signal is high, such that HV_OUT rises to the HV_IN level. When SEL is low, VGP is pulled to the HV_IN voltage through Resistor R1, and HV_OUT is pulled to ground through MN1, MN2 and MN3. The gate of MN3 is set to the VDD level to produce a voltage drop from the HV_OUT node to the MN2 and MN1 transistors.

Hardening aspects are:
There is redundancy in MP1, MP2 MOSFET pairs and MN1, MN2 MOSFET pairs;
These MOSFETs should be physically separated in the layout in order to reduce the chances that a radiation single event causes both transistors to go into a bipolar snap-back mode;
C1 and C2 are fabricated with thick-oxide metal-to-metal capacitors in order to reduce the incidence of Single Event induced Gate Rupture;
All MOSFETs have series ballast resistors to prevent a destructive secondary breakdown if they are involved in a single event induced snap-back;
NMOSFETs MN1, MN2 and MN3 should be laid out with annular-gate geometry in order to harden them to TID effects.

Figure 8:
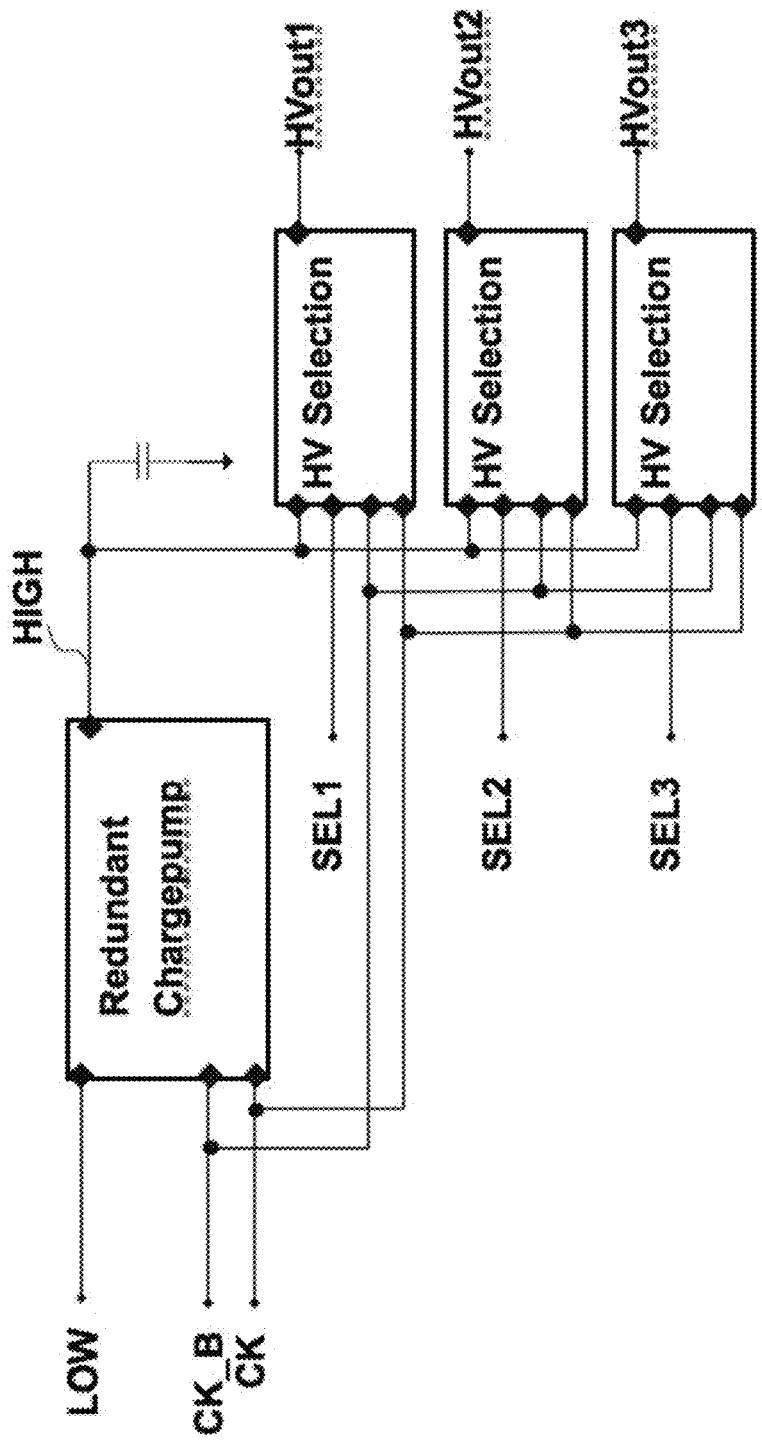
FIG. 8 is a logic schematic showing multiple high voltage routing switches.

FIG. 8 is a logic schematic showing implementation of how multiple high voltage routing switches can be placed on the pump output. This figure show how multiple hardened HV switches can be used to selectively route the high voltage to various nodes.

Figure 9:
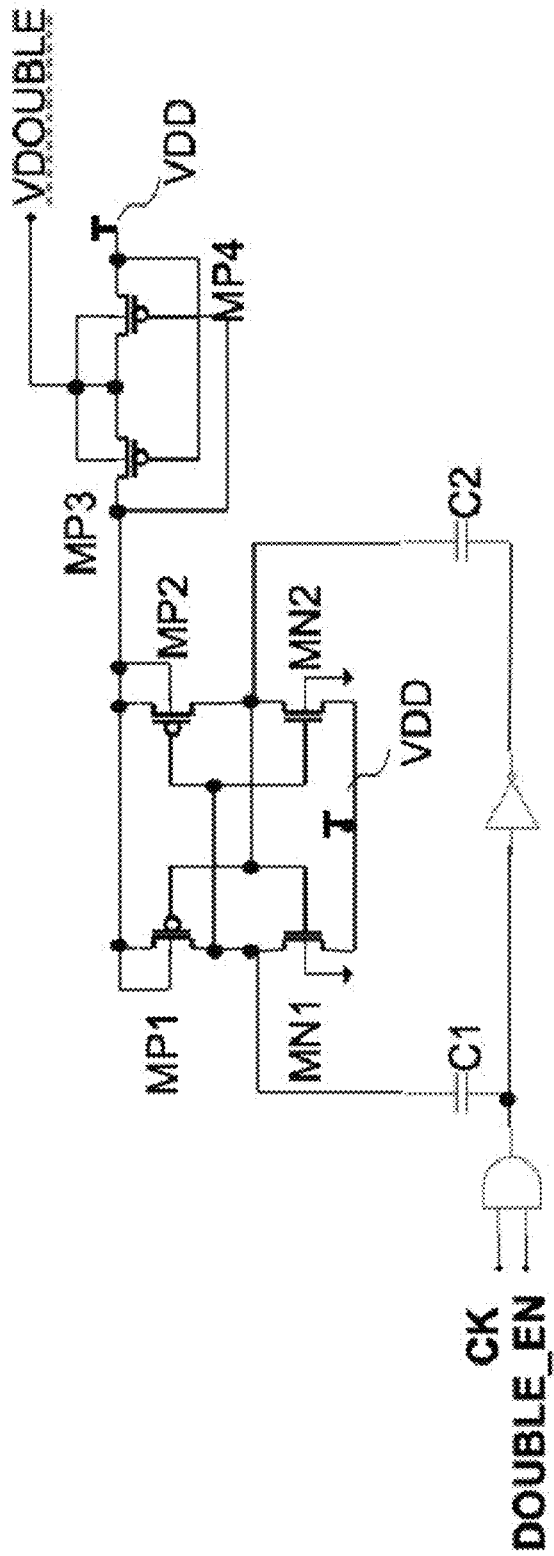
FIG. 9 is a logic schematic showing prior art voltage doublers (allows low power supply voltage operation).

FIG. 9 is a logic schematic showing implementation of prior art voltage doublers (allows low power supply voltage operation) with capacitors C1 and C2, PMOS transistors MP1-MP4, NMOS transistors MN1-MN2, and voltage supply VDD. To be clear, this prior art Voltage Doubler is NOT an alternative type of charge pump. This is an auxiliary circuit which can be used to overcome the low-supply voltage limitations of a hardened charge pump. For completeness, this circuit also must be hardened. When it is enabled, this auxiliary circuit provided double the power supply voltage at its output. This allows a charge pump to continue operating at a low power supply voltage. At its' output, transistors MP3 and MP4 act as a highside switch, such that the output node does not fall to ground if the voltage doubler circuit is disabled.

Figure 10:
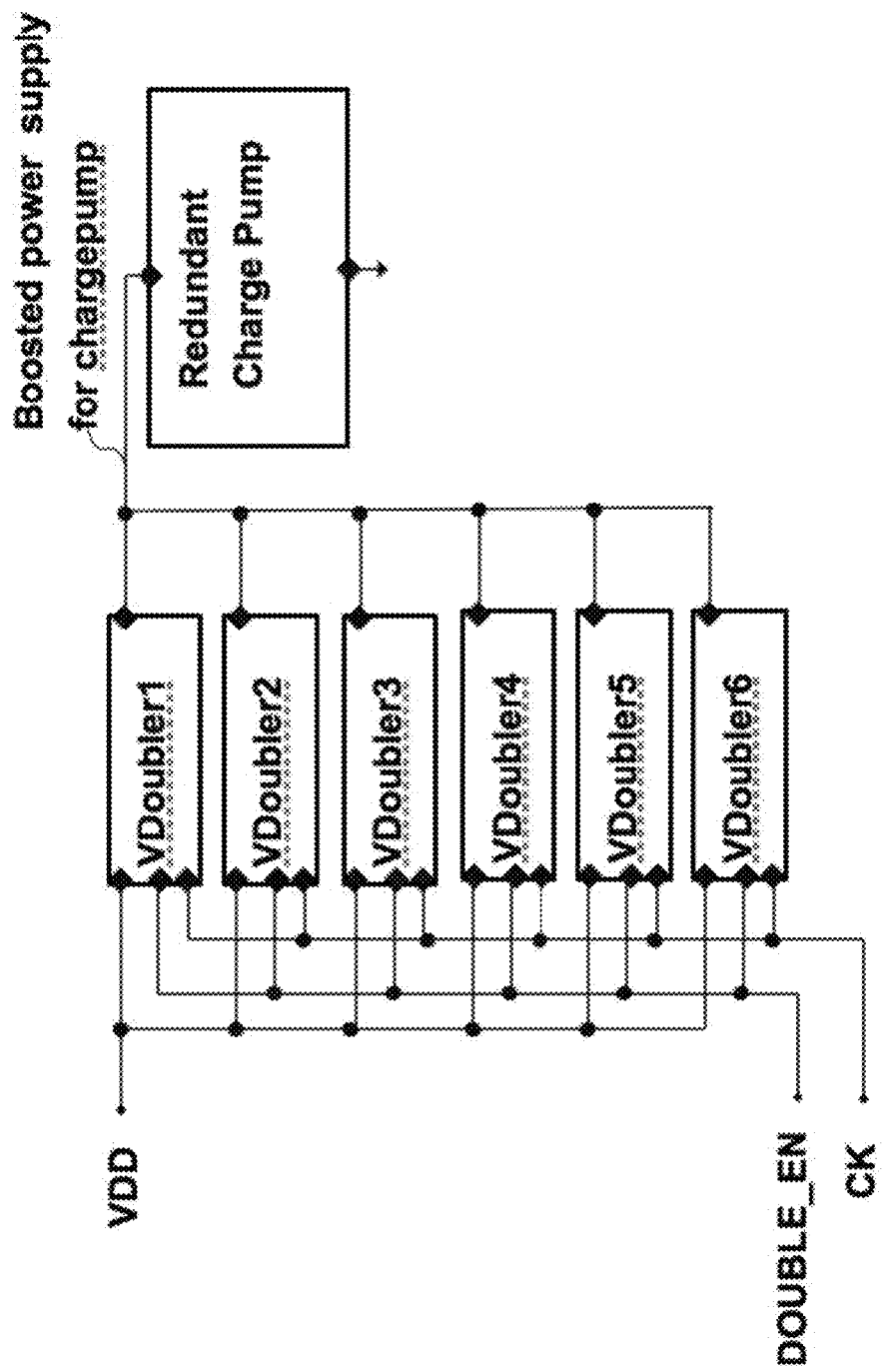
FIG. 10 is a logic schematic showing multiple redundant voltage doublers.

FIG. 10 is a logic schematic showing implementation of an improvement where multiple redundant voltage doublers allow continuous operation. By designing the Voltage Doubler auxiliary circuit as multiple redundant segments, the redundancy allows continuous operation even if one segment becomes disabled. Again, physical separation of the Single-Event sensitive portions of the circuit reduce the chance of simultaneous interruption.

Figure 11:
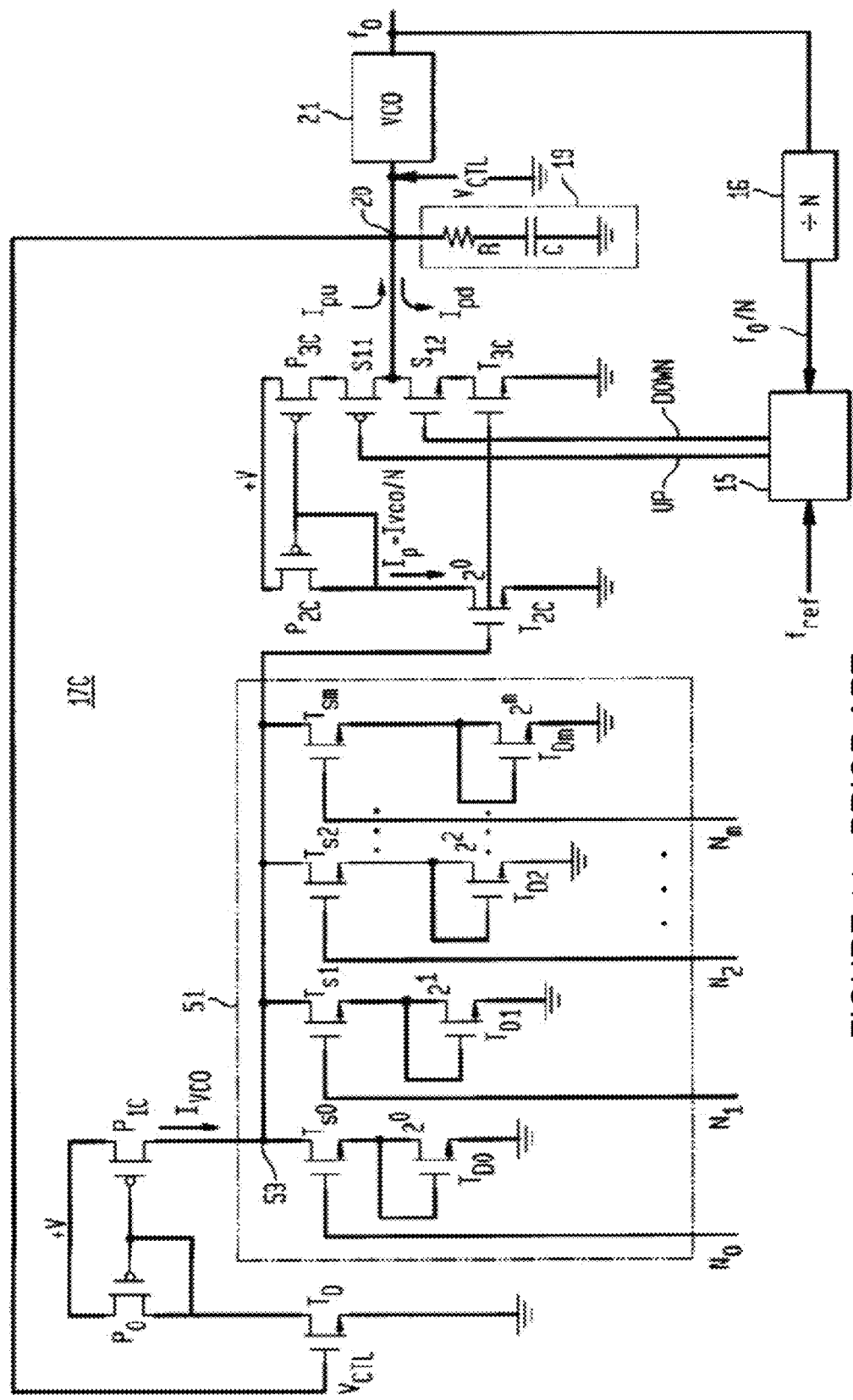
FIG. 11 is a logic schematic showing a prior art PLL charge pump.

FIG. 11 is a logic schematic showing implementation of a prior art phase-lock-loop (PLL) charge pump from U.S. Pat. No. 6,163,184 (FIG. 5 of U.S. Pat. No. 6,163,184), Dec. 19, 2000. This schematic is typical of most Phase-Lock-Loop (PLL) circuits. FIG. 11 shows a divider network 51 connected between node 53 and ground. This schematic shows control voltage Vctl with dividing transistors $T_{D0}$, $T_{D1}$, $T_{D2}$, ... $T_{Dm}$ in series with switching transistors $T_{S0}$, $T_{S1}$, $T_{S2}$, ... $T_{Sm}$. The gate-to-source path of a transistor $T_{2C}$ is connected between node 53 and ground and, where transistor $T_{2C}$ is sized to be of the same size as transistor $T_D\phi$, the current ($I_p$) flowing in the source-drain path of $T_{2C}$ is equal to $I_{vco}$/N. The gate-to-source path of a transistor $T_{3C}$ is connected in parallel with the gate-to-source path of $T_{2C}$ to produce a sink current $I_{pd}$ out of node 20 which will have the same amplitude current as the Ip where $T_{2C}$ and $T_{3C}$ are of the same size. The current in $T_{2C}$ is mirrored via transistors $P_{2C}$ and $P_{3C}$ to produce a source current $I_{pu}$ into node 20 which is designed to be equal to $I_{pd}$ by making $P_{2C}$ and $P_{3C}$ the same size. A detailed examination of the circuit of FIG. 11 confirms the operation outlined above. The current $I_{vco}$ mirrored via $P_{1c}$ and flowing into node 53 is divided into "m" paths. The left hand path can carry a unit of current ($2^0$) via TD$\phi$, the next path can carry 2 units of current ($2^1$) via TD1, the next one 4 units of current, and so on, until the "m"th path which can carry ($2^m$) units of current via TDm. The current paths are switched into the circuit by means of corresponding current switches Tso through Tsm. The current flowing through transistor TDq is equal to 1/N the $I_{vco}$ current flowing into node 53 (i.e., $I_{TD}\phi$=IVCO/N). Assuming the impedance of the current switches, when turned-on, to be negligible, note that the gate-to-source of transistor $T_{2C}$ is then in parallel with the gate-to-source paths of all the $T_{Di}$ transistors switched into the circuit. Then, by making the size of $T_{2C}$ the same as $T_D\phi$, the current mirrored in the source-drain path of $T_{2C}$ is equal to $I_{vco}$/N. This current is drawn through $P_{2C}$ and the current through $P_{2C}$ and $T_{2C}$ are respectively mirrored via $P_{3C}$ and $T_{3C}$ to produce an output current Ipu=Ipd=$I_{vco}$/N. In FIG. 11, the charge pump circuit 17c was modified to eliminate the dependence of $\omega_{BW}$ on the division ratio N. Transistor $P_{1C}$ mirrors current of $I_{VCO}$. Transistor $P_0$, Dividing transistor $T_D$, Phase detector 15, divider network 16, and Voltage Controlled Oscillator (VCO) 21 are shown.

In particular, in FIG. 11, MOSFETS $P_{3C}$, $S_{11}$, $S_{12}$, $T_{3C}$ form an Up/Down current source/current sink capability for modifying the reference voltage on node 20 in a controlled manner. Unfortunately these same MOSFETs are most sensitive part of a PLL to Single Event disturbs. During a single event, either the PMOS (P-type metal oxide semiconductor diode or FET) pull-up branch, or the NMOS (N-type) pull-down branch can be turned on with parasitic bipolar transistors. These bipolar transistors will conduct a thousand times the current conducted during normal operation. The resulting deviation in the reference voltage will cause a PLL to lose its' frequency lock.

Figure 12:
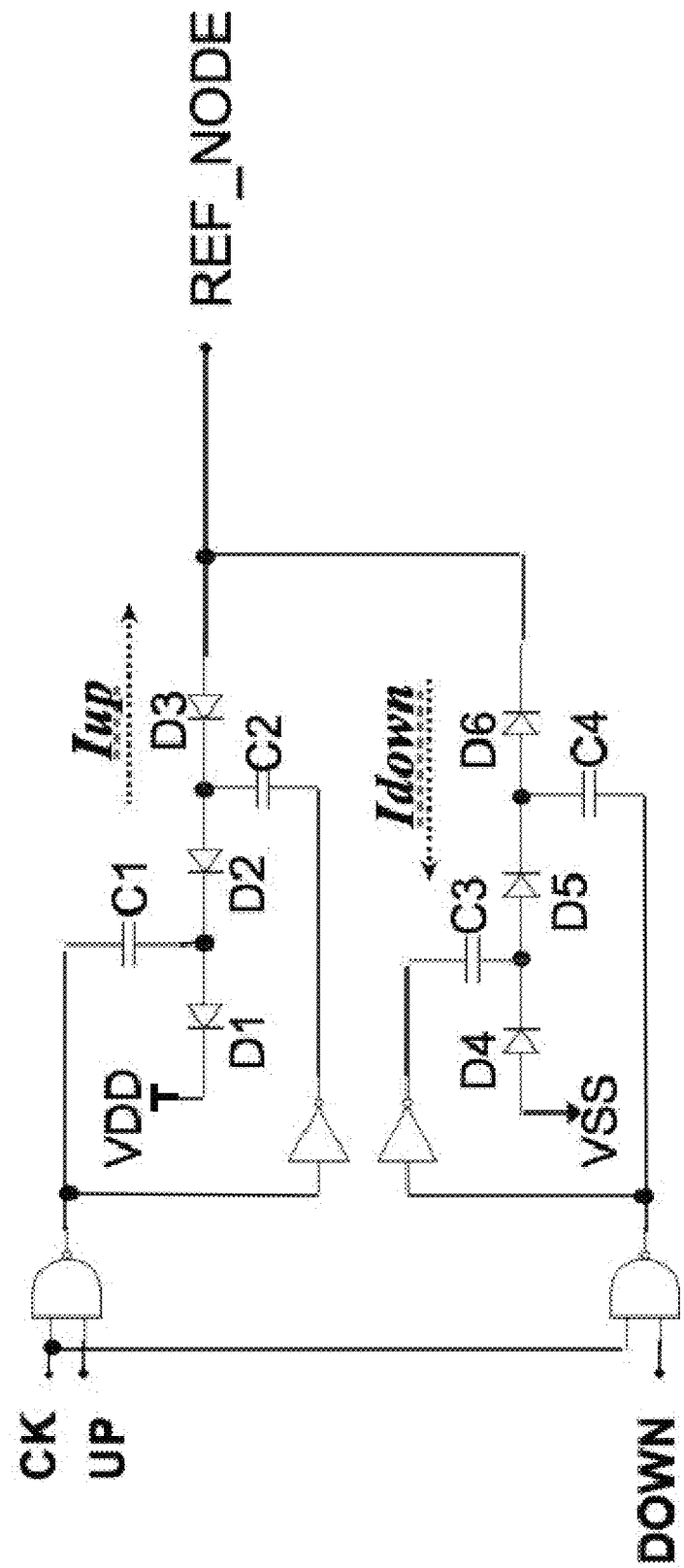
FIG. 12 is a logic schematic of a rad-hard charge pump replacement for PLLs.

FIG. 12 is a logic schematic showing implementation of an improvement where a radiation hardened PLL charge pump is implemented with polysilicon diode charge pumps. FIG. 12 shows voltage supply VDD and ground VSS, with diodes D1-D6, capacitors C1-C4, clock CK, and reference voltage node REF_NODE. The main idea of this figure is a hardened charge pump replacement for PLLs (phase locked loops), which is not an alternative type of high voltage pump. This circuit has the function of adding or subtracting charge for the reference node of a PLL in a synchronous, controller manner. During each clock cycle, there is either no change, the charge on C2 is transferred onto the reference node, or a charge on C4 is transferred off of the reference node.

Its' hardness advantages are:
1) If the diodes are implemented in 'diode connected' NMOS transistors, then this circuit has an advantage over the standard PLL charge pump in not having any direct path to either the ground or power supply node. The most error that is induced by a single event is the charge contained on one of the 4 capacitors shown. This charge can purposely be designed to be a manageable amount such that the PLL will not lose a lock if this pump is hit.
2) If the diodes are implemented as polysilicon diodes, then the circuit will be relatively insensitive to any Single Event Effects. Because the charge/discharge paths contain no NMOS transistors it is also hardened against total dose leakage current effects.

APPLICATIONS

The radiation hardened (rad-hard) charge pump described above may be used in a variety of applications, such as spacecraft, aircraft, airborne or spaceborne ordinance, and terrestrial devices and machines where radiation hardening is necessary or desired.

The charge pump circuit of the present invention could be implemented into a microelectromechanical system (MEMS) device comprising a MEMS transducer and an electronic circuit. The MEMS transducer may be formed on a separate integrated circuit to the electronic circuit, the two being electrically connected using, for example, bond wires. The MEMS transducer will comprise a MEMS capacitor $C_{MEMS}$ having plates that are connected to bond pads. The electronic circuit will comprise a charge pump circuit according to the present invention. The device circuitry may also comprise a resistor and a reservoir capacitor, an amplifier, a bias circuit, bond pads and/or an optional digital-to-analogue converter (DAC).

However the charge pump may be used for any application requiring a voltage level to be supplied. For example, it is contemplated for use in biasing the gate of a MOS transducer. Thus the charging circuit could be used in a number of different devices including, but not limited to an ultrasound imager, a sonar transmitter and/or receiver, a mobile phone or other communication device, a personal desktop assistant, an MP3 player or other personal audio device or a laptop computer.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed is:

1. A radiation hardened charge pump array, comprising: multiple parallel redundant charge pumps, each charge pump of said array consisting essentially of a radiation-hardened circuit component in combination with a capacitor, wherein each charge pump is physically separated on chip, wherein the array has n number of charge pumps and each charge pump has a voltage strength output of at least 1/(n−1) percent of output load, wherein the capacitor is a thick oxide metal-to-metal capacitor, wherein the radiation-hardened circuit component is selected from the group consisting of a polysilicon diode, a PMOS transistor in series with a ballast resistor, and a NMOS transistor in series with a ballast resistor.

2. The radiation hardened charge pump array of claim 1, wherein the radiation-hardened circuit component of each charge pump is a polysilicon diode.

3. The radiation hardened charge pump array of claim 1, wherein the radiation-hardened circuit component of each charge pump is a PMOS transistor in series with a ballast resistor.

4. The radiation hardened charge pump array of claim 1, wherein the radiation-hardened circuit component of each charge pump is a NMOS transistor in series with a ballast resistor.

5. The radiation hardened charge pump array of claim 1, wherein each of the charge pumps is a charge-positive charge pump.

6. The radiation hardened charge pump array of claim 1, wherein each of the charge pumps is a charge-negative charge pump.

7. The radiation hardened charge pump array of claim 1, wherein each of the charge pumps is connected to a circuit.

8. The radiation hardened charge pump array of claim 1, wherein each of the charge pumps is powered by a voltage doubler.

9. The radiation hardened charge pump array of claim 1, wherein each of the charge pumps is connected to a high-voltage switch.

10. The radiation hardened charge pump array of claim 1, wherein one or more of the charge pumps are utilized within a Phase Locked Loop.

11. A method of radiation hardening electronic circuitry in a spaceborne, airborne, or terrestrial device, comprising installing or integrating the radiation hardened charge pump array of claim 1 in an integrated circuit.

12. The method of claim 11, wherein the radiation-hardened circuit component of each charge pump is a polysilicon diode.

13. The method of claim 11, wherein the radiation-hardened circuit component of each charge pump is a PMOS transistor in series with a ballast resistor.

14. The method of claim 11, wherein the radiation-hardened circuit component of each charge pump is a NMOS transistor in series with a ballast resistor.

15. The method of claim 11, wherein each of the charge pumps is a charge-positive charge pump.

16. The method of claim 11, wherein each of the charge pumps is a charge-negative charge pump.

17. The method of claim 11, wherein each of the charge pumps is connected to a circuit.

18. The method of claim 11, wherein each of the charge pumps is powered by a voltage doubler.

19. The method of claim 11, wherein each of the charge pumps is connected to a high-voltage switch.

20. The method of claim 11, wherein one or more of the charge pumps are utilized within a Phase Locked Loop.

21. The method of claim 11, wherein the radiation is selected from the group consisting of neutron, proton, gamma, thermal, alpha, x-ray, cosmic, heavy ion, particle, and combinations thereof.

* * * * *